United States Patent [19]

Sturgis et al.

[11] Patent Number: 4,727,903

[45] Date of Patent: Mar. 1, 1988

[54] FLUID SHUTOFF VALVE

[75] Inventors: Malcolm B. Sturgis, 6227 Rosebury Ave., St. Louis, Mo. 63105; Richard E. Hoffman, Overland Park, Kans.

[73] Assignee: Malcolm B. Sturgis, St. Louis, Mo.

[21] Appl. No.: 67,718

[22] Filed: Jun. 26, 1987

[51] Int. Cl.⁴ ............................................. F16K 31/12
[52] U.S. Cl. ..................................... 137/461; 137/75; 137/471; 137/486
[58] Field of Search ................. 137/460, 461, 73, 75, 137/471, 486

[56] References Cited

U.S. PATENT DOCUMENTS

| | | | |
|---|---|---|---|
| 2,989,971 | 6/1961 | Valentine | 137/471 X |
| 3,138,172 | 6/1964 | Jentoft | 137/486 |
| 4,290,440 | 9/1981 | Sturgis | 137/75 |

*Primary Examiner*—Harold W. Weakley
*Attorney, Agent, or Firm*—Senniger, Powers, Leavitt and Roedel

[57] ABSTRACT

An excess pressure and/or excess flow/temperature shutoff valve comprising a valve housing having an axial bore therethrough with inlet and outlet ends, a portion of the bore being enlarged to form a valve chamber, and a spool movable in the valve chamber and having a sealing fit with the walls of the chamber. In the event of an upstream pressure increase of predetermined magnitude, the spool is adapted to move from an open position in which it permits flow of fluid through the bore to a position wherein additional spool area is exposed to the upstream fluid pressure, whereupon the spool is adapted to move further downstream to a shut off position for blocking the flow of fluid through the bore. The valve may be optionally equipped to shut off the flow of fluid in the event of a downstream pressure decrease as a result of excess leakage and/or an increase in fluid temperature in excess of a predetermined value.

25 Claims, 6 Drawing Figures

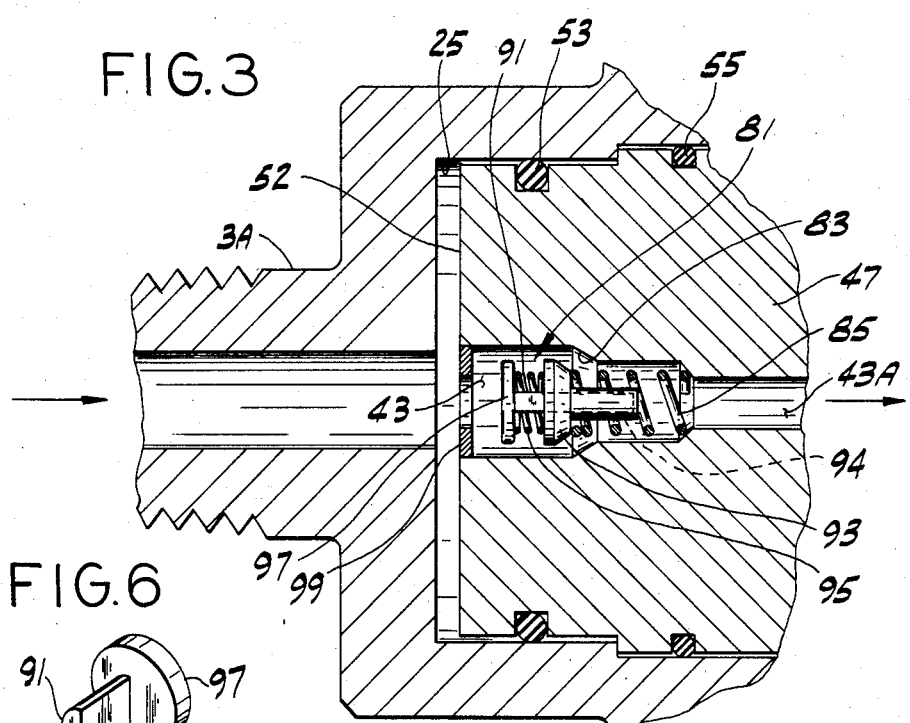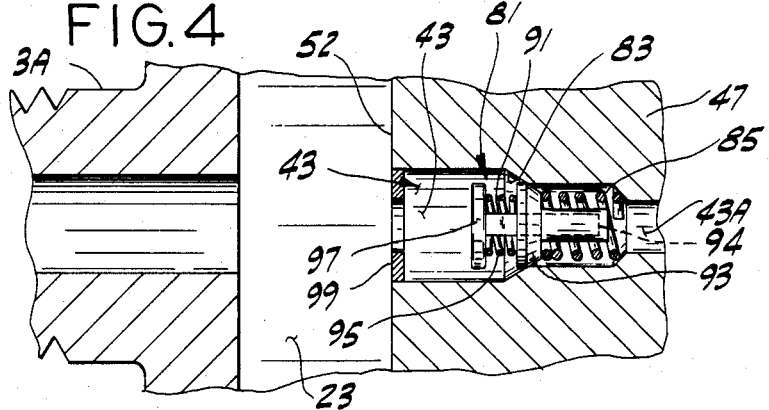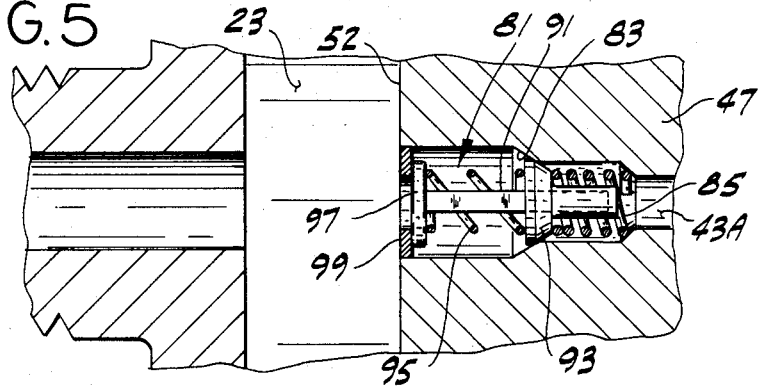

FLUID SHUTOFF VALVE

BACKGROUND OF THE INVENTION

This invention relates generally to fluid pressure regulator valves, and more particularly to a shutoff valve for shutting off the flow of a fluid under certain conditions, such as when an system pressure exceeds a predetermined pressure or where a gross leak develops in the delivery system downstream from the valve resulting in a dramatic increase in flow.

This invention has particular (albeit not exclusive) application to regulating the flow of gas, such as gas used for fuel. Conventional gas regulators function to establish and maintain a substantially constant delivery pressure in a system as the source (e.g., cylinder) pressure changes in response to temperature and other conditions. Gas systems also typically incorporate a safety relief valve to vent pressurized gas in the event of a pressure control failure. At some predetermined pressure, the safety valve opens and gas is permitted to vent to the atmosphere at a rate proportional to the inlet pressure. Such pressure relief valves have at least two serious drawbacks. First, flammable and/or toxic gas is allowed to accummulate at or near the safety valve. This creates the risk of an explosion and fire. Moreover, the accummulated gas may pose a health hazard to persons in close proximity to the valve, especially in a confined space. Second, the relief valve may be incapable of venting gas at a rate sufficient to avoid substantial downstream pressure increases which may damage downstream components of the system.

There is also a need in the industry for an excess pressure shutoff valve which is responsive to a substantial drop in downstream pressure (due to a line rupture downstream from the valve, for example) to shut off the flow of fluid through the valve.

SUMMARY OF THE INVENTION

Among the several objects of the invention may be noted the provision of a fluid shutoff valve which has particular (albeit not exclusive) application to fuel gas delivery systems; the provision of such a shutoff valve which is designed to shut off the flow of gas, without venting the gas, when the system pressure upstream of the valve rises to a predetermined level; the provision of such a shutoff valve which is responsive to a substantial downstream pressure drop to shut off the flow of fluid through the system, so that in the event of a line rupture downstream from the valve, the escape of fluid from the system is minimized; the provision of such a valve which is temperature sensitive and adapted to block the flow of fluid through the valve in the event the temperature of the valve rises above a predetermined temperature; the provision of such a shutoff valve which is reliable in operation; and the provision of such a valve which is economical to manufacture.

Generally, an excess pressure shutoff valve of the present invention comprises a valve housing having an axial bore therethrough with inlet and outlet ends. The bore is enlarged between its inlet and outlet ends to form a valve chamber comprising a first portion bounded by a first annular wall extending generally axially of the valve housing and a second portion downstream from the first portion bounded by a second annular wall extending generally axially of the valve housing, the second annular wall having an inside diameter greater than the inside diameter of said first annular wall thereby to form internal shoulder means in the valve chamber. Located in the valve chamber is a valve means having a passage for the flow of pressurized fluid from the inlet end of the bore to the outlet end of the bore. The valve means has a first valve portion received in the first portion of the valve chamber and a second valve portion downstream from the first valve portion received in the second portion of the valve chamber. The second valve portion has an outside diameter greater than the outside diameter of said first valve portion thereby to form external shoulder means on the valve means. First seal means provides a sealing fit between the first valve portion and the first annular wall of the valve chamber and second seal means provides a sealing fit between the second valve portion and the second annular wall of the valve chamber. The valve means is movable in the valve chamber between an open position permitting flow from the inlet end of the bore to the outlet end of the bore via said valve passage and a shutoff position blocking flow. Spring means biases the valve means toward its open position, the arrangement being such that the valve means is responsive to an increase in upstream fluid pressure of predetermined magnitude to move downstream in the valve chamber a sufficient distance relative to said annular radial shoulder to break the sealing fit provided by the first seal means whereby said external shoulder means on the valve means is exposed to the upstream fluid pressure and the valve means is adapted to move further downstream to its shutoff position.

In another aspect of the invention, the shutoff valve comprises a valve housing having an axial bore therethrough with inlet and outlet ends for flow of pressurized fluid therethrough. The bore is enlarged between its inlet and outlet ends to form a valve chamber extending generally axially with respect to the housing and having a relatively large-diameter portion and a relatively small-diameter portion downstream from the large-diameter portion. Located within the valve chamber is valve means having a passage communicating at one end thereof, constituting its inlet end, with said large-diameter valve chamber portion and communicating at its other end, constituting its outlet end, with said small-diameter valve chamber portion for flow of pressurized fluid from the inlet end of the bore to the outlet end of the bore. The valve means comprising a valve head in said large-diameter portion of the valve chamber and a valve stem extending axially from the head into said small-diameter portion of the valve chamber. The valve head has upstream and downstream faces extending generally radially with respect to the valve housing and further has a diameter substantially greater than the diameter of the valve stem. Upstream seal means disposed between said upstream and downstream faces of the valve head provides a sealing fit between the valve head and wall of the large-diameter portion of the valve chamber, and downstream seal means provides a sealing fit between said valve stem and wall of the small-diameter portion of the valve chamber. A passageway in the valve housing communicates with the large-diameter chamber portion for exposing the downstream face of the valve head to ambient pressure. A bore valve seat is disposed adjacent the outlet end of the bore, the valve means being movable in the valve chamber between an open position permitting flow from the inlet end of the bore to the outlet end of the bore via said valve passage and a shutoff position in which the valve stem is sealingly engageable with the bore valve seat for blocking flow. Spring means biases the valve means toward its open position, the arrangement being such that the valve means is responsive to an increase in upstream fluid pressure of predetermined magnitude to move downstream in the valve chamber against the bias of the spring means and ambient pressure from its open position to its shutoff position.

Other objects and features will be in part apparent and in part pointed out hereinafter.

BRIEF DESCRIPTION OF THE DRAWINGS

FIG. 3 is a enlarged view of a portion of FIG. 1 showing a modification of the shutoff valve to include an excess flow/temperature sensitive valve member, the latter being depicted in an open position;

FIG. 4 is a view similar to FIG. 3 showing the valve member in a closed position in response to an excess drop in downstream pressure;

FIG. 5 is a view similar to FIG. 3 showing the valve member in a closed position in response to excess temperature; and FIG. 6 is a perspective view of a part of the valve member of FIGS. 3-5.

DESCRIPTION OF THE PREFERRED EMBODIMENT

Figure 1:
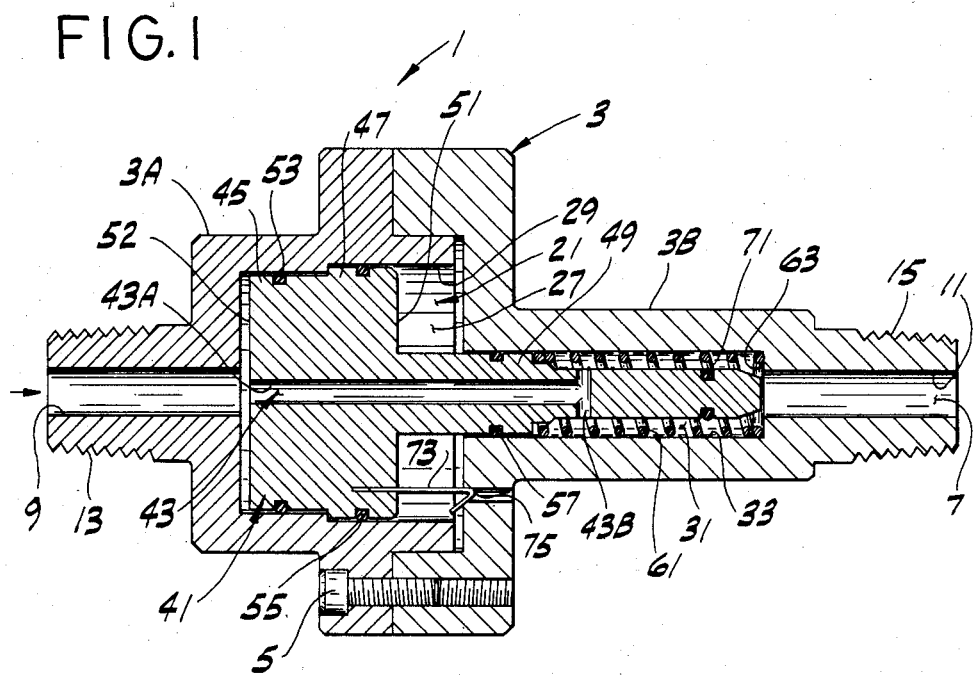
FIG. 1 is a cross-sectional view showing a shutoff valve of the present invention in an open position.
Figure 2:
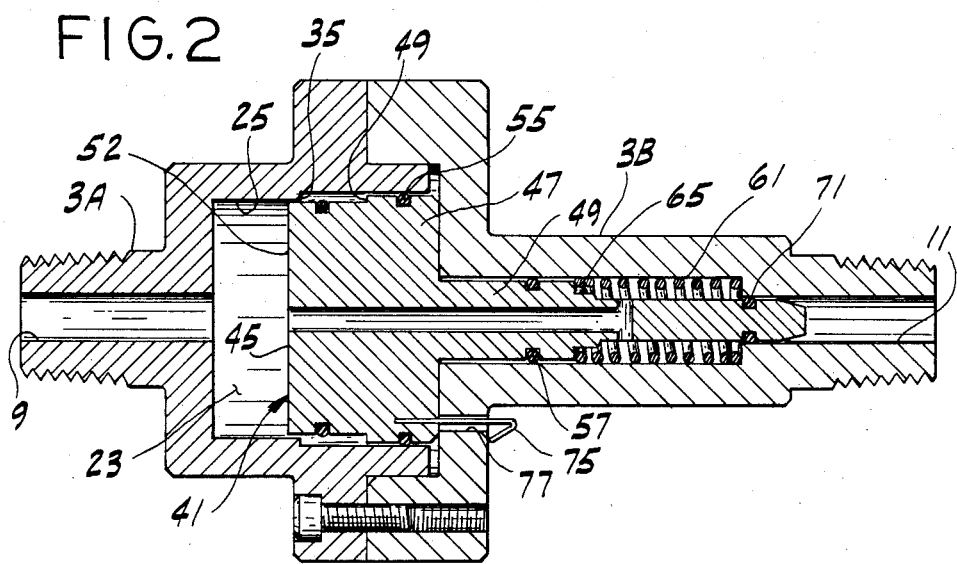
FIG. 2 is a view similar to FIG. 1 showing the valve in a shutoff position.

Referring now to the drawings, a fluid shutoff valve of the present invention is indicated in its entirety by the reference numeral 1, flow being from left to right as viewed in FIGS. 1 and 2. The valve comprises a two-part valve housing generally designated 3, the upstream (left) part being indicated at 3A and the downstream (right) part at 3B. The two parts are detachably connected by means comprising a plurality of bolts 5. A circular bore 7 having inlet and outlet ends designated 9 and 11, respectively, extends axially through the valve housing for flow of pressurized fluid (e.g., gas) through the housing. The inlet and outlet ends of the housing are externally threaded as indicated at 13 and 15, respectively, for attachment of the valve housing to suitable pressure system components, such as the outlet of a pressure regulator (not shown) and delivery system.

The bore 7 is enlarged between its inlet and outlet ends 9, 11 to form a valve chamber, generally designated 21, comprising a first (upstream) relatively largediameter portion 23 bounded by a first round annular wall 25 extending generally axially of the housing, a second (intermediate) portion 27 of even larger diameter bounded by a second round annular wall 29 extending generally axially of the valve housing, and a third (downstream) portion 31 of relatively small diameter bounded by a third round annular wall 33 extending generally axially of the valve housing. As is apparent from the drawings, the inside diameter of annular wall 25 is less than the inside diameter of annular wall 29 (e.g., 1.250 in. vs. 1.312 in.), thereby forming shoulder means in the valve chamber in the form of an annular shoulder 35 lying in a place extending generally radially with respect to bore 7 at the juncture of the upstream and intermediate portions 23, 27 of the valve chamber 21. Annular wall 33 has an inside diameter (e.g., 0.437 in.) less than the inside diameter of annular wall 29.

Disposed within the valve chamber 21 is valve means comprising a spool or piston, generally designated 41, having an integral (one-piece) body with a passage 43 therethrough for flow of pressurized fluid from the inlet end 9 of the bore 7 to the downstream portion 31 of the valve chamber and thence to the outlet end 11 of the bore. More specifically, passage 43 has a first reach 43A extending axially through the spool body and terminating short of the downstream end of the spool and a second reach 43B extending generally radially of the housing and providing fluid communication between the axial reach 43A and the downstream portion 31 of the valve chamber.

As illustrated, the spool 41 has a generally cylindric first (upstream) cylindric portion 45 disposed in the upstream portion 23 of the valve chamber and having a relatively close clearance fit with annular wall 25, a second (intermediate) cylindric portion 47 disposed in the intermediate portion 27 of the valve chamber and having a relatively close clearance fit with annular wall 29, and a third (downstream) cylindric portion 49 disposed in the downstream portion 31 of the valve chamber and having a relatively close clearance fit with annular wall 33. The upstream and intermediate portions 45 and 47 combine to form what may be considered to be the head of the spool 41, and the third downstream portion 49 forms what may be considered to be the stem of the spool. As will appear from the drawings, the intermediate portion 47 of the spool has an outside diameter greater than the outside diameters of the upstream and downstream portions of the spool (e.g., 1.306 in. vs. 1.244 in. and 0.431 in., respectively). As a result, the spool has a first external annular shoulder 49 (which may be referred to as external shoulder means) lying in a plane extending generally radially with respect to bore 7 at the juncture of the upstream and intermediate portions 45, 47 of the spool, and a second external annular shoulder 51 lying in a radial plane generally parallel to the plane of shoulder 49 at the juncture of its intermediate and downstream portions 47, 49 of the spool. The shoulder 51 may be considered to be the downstream face of the head of the spool as defined above, the upstream face of the head being indicated at 52. Three O-ring seals 53, 55 and 57 (consitituting first, second and third seal means) provide sealing fits between the upstream, intermediate and downstream portions 45, 47 49 of the spool and respective annular walls 25, 29 and 33.

It will be noted that while the upstream face 52 of the head of the spool 41 is exposed to upstream pressure and the downstream end of stem of the spool is exposed to downstream pressure, the shoulder 51 of the head is exposed to ambient pressure by an axial passageway 77 (or series of passageways) in the downstream part 3B of the valve housing 3. Because the spool head (that is, spool portions 45 and 47) is not exposed to downstream pressure, and because the cross-sectional area of the spool stem (that is, spool portion 49) is small compared to the upstream face 52 of the spool, the spool will be responsive to increases in upstream fluid pressure substantially independent of downstream fluid pressure.

A coil compression spring 61 located in the downstream portion 31 of bore 7 reacts against an internal shoulder 63 in the valve housing and an external shoulder 65 on the downstream portion 49 of the spool to bias or urge the spool toward an open position (FIG. 1) wherein the O-rings 53, 55 and 57 are in sealing engagement with their respective annular walls 25, 29 and 33, the external shoulder 49 on the spool is face-to-face with the internal shoulder 35 of bore 7, and the downstream end or nose of the spool is spaced relative to the outlet end 11 of the bore to permit flow of pressurized fluid through the valve. The strength of this spring 61 is such as to maintain the spool in an open position until a predetermined upstream fluid pressure is reached, at which point the spool will move downstream against the combined urgings of spring 61 and ambient pressure on shoulder 51 (the bias resulting from fluid pressure on the downstream end of the spool is relatively small), to a shutoff position (FIG. 2) wherein the downstream end of the spool, which is tapered, enters the outlet end 11 of the bore and an O-ring 71 mounted on the downstream portion 49 of the spool seals against the wall of the bore 7 (the bore wall thus constituting, in essence, a valve seat) to block the flow of fluid through the bore.

Thus it will be understood that under normal flow conditions, the spool 41 will assume the open position shown in FIG. 1 in the spool chamber 21. In the event the upstream fluid pressure increases above a predetermined magnitude, the spool will move downstream in the valve chamber a distance sufficient to enable O-ring 53 to clear (i.e., move past) shoulder 35, thereby breaking the sealing fit between the O-ring and annular wall 25. When this happens, as a result of the increased spool area exposed to the upstream fluid pressure (the increased spool area being represented by the area of annular shoulder 49), the spool will move further downstream against the bias of spring 61 to the stated shutoff position.

A manual reset mechanism is provided in the form of a spring latch 73 projecting axially downstream from shoulder 51 of the spool. As the spool moves toward its shutoff position, a hook-shaped head 75 on the latch is adapted resiliently to bend to permit passage of the latch through passageway 77 in the valve housing, and resiliently to spring back to its unstressed configuration (as shown in FIG. 2) as it exits the passageway when the spool reaches its shutoff position. As a result, the spool is held in its shutoff position until such time as the head 75 of the latch is manually compressed to enable its passage back through passageway 77 whereupon the spool will return under the bias of spring 61 to its open position.

It will be observed that the shutoff valve 1 of this invention has the capability of functioning as a metering device for limiting the escape of fluid from the system in the event of a line rupture downstream from the valve. This is accomplished by making the diameter of passage 43 sufficiently large to satisfy downstream requirements under normal operating conditions but sufficiently small to limit flow in the event of a line rupture. For a valve having the exemplary dimensions given above, reach 43A of passage 43 may have a diameter of 0.125 in. and reach 43B may have a diameter of 0.088 in.

FIGS. 3-6 show a shutoff valve of the present invention modified to incorporate what may be referred to as an excess flow feature whereby the valve is adapted to shut off the flow of fluid through passage 43 in the event of a substantial pressure drop downstream from the valve, as in the case of a line rupture, for example. The valve is identical to shutoff valve 1 described above (corresponding parts being identified by corresponding reference numerals) except that the inlet end of passage 43 is enlarged to receive a valve member generally designated 81 which is movable in reach 43A of passage 43 from an open position to permit flow through the passage to a closed position in which the valve member 81 is sealingly engageable with a valve seat 83 to block flow through the passage. A spring indicated at 85 urges the valve member toward its open position and is sized so that the valve member is adapted to close if the pressure downstream of the valve member 81 drops a predetermined amount indicative of a line rupture, for example.

The valve member 81 may also be designed to be responsive to a rise in temperature of the valve member to move to its closed position independent of the pressure differential across the valve member. This is particularly advantageous during a fire, for example, where it is important that the flow of gas be shut off. Thus, the valve member 81 is preferably a two-piece valve generally of the type disclosed in U.S. Pat. No. 4,290,440. It comprises a stem 91 of suitable metal (e.g., brass) and sealing means in the form of a sealing member 93 (also of a suitable metal such as brass) having a central axial bore 94 therein in which the stem 91 is received and secured in fixed position by means of a solder bond set to melt at a relatively low temperature (e.g., about 200° F.) well below the temperature at which the fluid would ignite. The solder used for this bond is preferably a eutectic solder (such as that sold under the trade designation "212° fuseable metal—Alloy No 3940-1" by Metal Specialties Co. of Fairfield, Conn. and Cerro Copper Products of East St. Louis, Ill.) adapted to melt within a relatively narrow temperature range of 10° or less (e.g., 200°-210°).

As illustrated in FIG. 5, if the melting point of the solder bond is exceeded, the bond will fail and an expansion spring 95 disposed between the sealing member 93 and a circular head 97 on the stem 91 will force the stem and head upstream against a retaining ring 99 in the passage 43 and the sealing member 93 downstream into sealing engagement with valve seat 83 to block the flow of fluid therepast. This movement is independent of any increase in upstream pressure and any decrease in downstream pressure. Of course, spring 95 should be sized to overcome the force of spring 85 in the event the eutectic bond fails at a time when there is no drop in downstream pressure otherwise sufficient to cause the valve member 81 to close.

The stem 91 of the valve member 81 is so sized and configured relative to the bore 94 in which it is received that there is sufficient space to accommodate the eutectic solder creating the bond between the stem 91 and sealing member 93. As illustrated in FIG. 6, the stem has a hemispherical cross-sectional shape for this purpose, although other configurations may also be suitable.

It will be apparent, therefore, that the shutoff valve of this invention may serve various functions. First, it is adapted to shut off the flow of fluid in the event of a significant increase in upstream fluid pressure, as in the event of a malfunction of a pressure regulator, for example. Second, it may be constructed so that it is also responsive to a significant downstream pressure drop, which would occur, for example, in the case of a line rupture, to shut off the flow of fluid through the system. And third, it may further function as a temperature responsive device adapted to shut off the flow of fluid in the event the temperature of the valve becomes excessive.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A fluid shutoff valve comprising a valve housing having an axial bore therethrough with inlet and outlet ends, said bore being enlarged between said inlet and outlet ends to form a valve chamber comprising a first portion bounded by a first annular wall extending generally axially of the valve housing and a second portion downstream from the first portion bounded by a second annular wall extending generally axially of the valve housing, said second annular wall having an inside diameter greater than the inside diameter of said first annular wall thereby to form internal shoulder means in the valve chamber, valve means in said valve chamber having a passage for the flow of pressurized fluid from the inlet end of the bore to the outlet end of the bore, said valve means having a first valve portion received in said first portion of the valve chamber and a second valve portion downstream from the first valve portion received in said second portion of the valve chamber, said second valve portion having an outside diameter greater than the outside diameter of said first valve portion thereby to form external shoulder means on said valve means, first seal means providing a sealing fit between said first valve portion and said first annular wall of the valve chamber and second seal means providing a sealing fit between said second valve portion and said second annular wall of the valve chamber, said valve means being movable in the valve chamber between an open position permitting flow from the inlet end of the bore to the outlet end of the bore via said valve passage and a shutoff position blocking said flow, and spring means biasing said valve means toward said open position, the arrangement being such that said valve means is responsive to an increase in upstream fluid pressure of predetermined magnitude to move downstream in the valve chamber a sufficient distance relative to said internal shoulder means to break the sealing fit provided by said first seal means whereby said external shoulder means on said valve means is exposed to said upstream fluid pressure and said valve means is adapted to move further downstream to said shutoff position.

2. A shutoff valve as set forth in claim 1 wherein said valve chamber further comprises a third portion downstream from said second valve chamber portion bounded by a third annular wall extending generally axially of the valve housing, said third wall having an inside diameter less than the inside diameter of said second annular wall, said valve means further comprising a third portion received in the third portion of the valve chamber, and third seal means providing a sealing fit between said third valve portion and said third annular wall.

3. A shutoff valve as set forth in claim 2 wherein said valve means comprises a spool of integral construction, said external shoulder means comprising an external annular generally radial shoulder on the spool at the juncture of said first and second valve portions.

4. A shutoff valve as set forth in claim 3 wherein said third portion of the spool has a reduced-diameter end adapted for sealing engagement with the outlet end of said bore when the spool is in its shutoff position.

5. A shutoff valve as set forth in claim 4 wherein said passage through the spool has a first reach extending generally axially of the housing and terminating short of the downstream end of the spool, and a second reach extending generally radially of the housing and providing fluid communication between the axial reach and the downstream portion of the valve chamber.

6. A shutoff valve as set forth in claim 2 wherein said first seal means comprises an O-ring seal mounted on said first valve portion.

7. A shutoff valve as set forth in claim 6 wherein said second seal means comprises an O-ring seal mounted on said second valve portion.

8. A shutoff valve as set forth in claim 7 wherein said third seal means comprises an O-ring seal mounted on said third valve portion.

9. A shutoff valve as set forth in claim 1 further comprising reset means for holding said valve means in its shutoff position, said reset means being manually operable to release said valve means to enable it to return to its open position under the bias of said spring means.

10. A shutoff valve as set forth in claim 9 wherein said reset means comprises spring latch means biased toward a latching position wherein said valve means is held in said shutoff position.

11. A shutoff valve as set forth in claim 1 wherein said valve housing comprises separate upstream and downstream parts and means for detachably connecting said parts.

12. A shutoff valve as set forth in claim 1 wherein said internal shoulder means comprises an internal annular shoulder lying in a plane extending generally radially with respect to said bore generally at the juncture of said first and second portions of said valve chamber.

13. A shutoff valve as set forth in claim 12 wherein said external shoulder means comprises an external annular shoulder lying in a plane extending generally radially with respect to said bore generally at the juncture of said first and second valve portions of said valve means, said internal and external shoulders being disposed face-to-face when said valve means is in said open position.

14. A shutoff valve as set forth in claim 13 wherein said valve chamber further comprises a third portion downstream from said second valve chamber portion bounded by a third annular wall extending generally axially of the valve housing, said third wall having an inside diameter less than the inside diameter of said second annular wall, said valve means further comprising a third portion received in the third portion of the valve chamber, and third seal means providing a sealing fit between said third valve portion and said third annular wall.

15. A shutoff valve as set forth in claim 14 wherein said third valve portion has an outside diameter less than the outside diameter of said second valve portion thereby to form a second external annular shoulder on said valve means lying in a plane extending generally radially with respect to said bore.

16. A shutoff valve as set forth in claim 15 further comprising reset means for holding said valve means in its shutoff position, said reset means being manually operable to release said valve means to enable it to return to its open position under the bias of said spring means.

17. A shutoff valve as set forth in claim 16 wherein said reset means comprises spring latch means biased toward a latching position wherein said valve means is held in said shutoff position.

18. A shutoff valve as set forth in claim 17 wherein said spring latch is carried by said valve means and extends downstream from said second external annular shoulder on the valve means, said spring latch being engageable with the valve housing when said valve means is in said shutoff position to latch said valve means in said shutoff position.

19. A shutoff valve as set forth in claim 1 further comprising a valve seat in said passage, a valve member movable in the passage between a closed position in which the valve member is engageable with said valve seat to block flow of fluid therepast and an open position in which said valve member is spaced from the valve seat to permit flow of fluid through the passage, and spring means biasing said valve member toward its open position, said valve member being responsive to a downstream pressure drop of sufficient magnitude to move against the bias of said spring means to said closed position.

20. A shutoff valve as set forth in claim 19 wherein said valve member is responsive to a rise in temperature of the valve member to move to its closed position independent of the pressure drop across the valve member.

21. A shutoff valve as set forth in claim 20 wherein said valve member comprises a valve stem and sealing means on the valve stem engageable with said valve seat, said sealing means being secured in fixed position with respect to the valve stem by means having a relatively low melting point whereby when said melting point is exceeded, said spring means is adapted to move said sealing means with respect to the valve stem into sealing engagement with the valve seat.

22. A fluid shutoff valve comprising a valve housing having an axial bore therethrough with inlet and outlet ends for flow of pressurized fluid therethrough, said bore being enlarged between said inlet and outlet ends to form a valve chamber extending generally axially with respect to the housing and having a relatively large-diameter portion and a relatively small-diameter portion downstream from the large-diameter portion, valve means in said valve chamber having a passage communicating at one end thereof, constituting its inlet end, with said large-diameter valve chamber portion and communicating at its other end, constituting its outlet end, with said small-diameter valve chamber portion for flow of pressurized fluid from the inlet end of the bore to the outlet end of the bore, said valve means comprising a valve head in said large-diameter portion of the valve chamber and a valve stem extending axially from the head into said small-diameter portion of the valve chamber, said valve head having upstream and downstream faces extending generally radially with respect to the valve housing and further having a diameter substantially greater than the diameter of said valve stem, upstream seal means disposed between said upstream and downstream faces of the valve head providing a sealing fit between said valve head and wall of the large-diameter portion of the valve chamber, downstream seal means providing a sealing fit between said valve stem and wall of the small-diameter portion of the valve chamber, a passageway in the valve housing communicating with said large-diameter chamber portion for exposing said downstream face of the valve head to ambient pressure, a valve seat in the bore adjacent its outlet end, said valve means being movable in the valve chamber between an open position permitting flow from the inlet end of the bore to the outlet end of the bore via said valve passage and a shutoff position in which said valve stem is sealingly engageable with said bore valve seat for blocking said flow, and spring means biasing said valve means toward said open position, the arrangement being such that said valve means is responsive to an increase in upstream fluid pressure of predetermined magnitude to move downstream in the valve chamber against the bias of said spring means and ambient pressure from its open position to its shutoff position.

23. A shutoff valve as set forth in claim 22 further comprising a valve seat in the passage in said valve means, a valve member movable in the passage between a closed position in which the valve member is engageable with said valve seat to block flow of fluid therepast and an open position in which said valve member is spaced from the valve seat to permit flow of fluid through the passage, and spring means biasing said valve member toward its open position, said valve member being responsive to a drop in downstream fluid pressure of sufficient magnitude to move against the bias of said spring means to said closed position.

24. A shutoff valve as set forth in claim 13 wherein said valve member is responsive to a rise in temperature of the valve member to move to its closed position independent of the pressure drop across the valve member.

25. A shutoff valve as set forth in claim 24 wherein said valve member comprises a valve member stem and sealing means on the valve member stem engageable with said valve seat, said sealing means being secured in fixed position with respect to the valve member stem by means having a relatively low melting point whereby when said melting point is exceeded, said spring means is adapted to move said sealing means with respect to the valve member stem into sealing engagement with the valve seat.

* * * * *